G. H. WILSON.

PREHEATER.

APPLICATION FILED DEC. 9, 1914.

Reissued Jan. 12, 1915.

13,868.

2 SHEETS—SHEET 1.

WITNESSES

Chas. A. Leibman

INVENTOR

George H. Wilson

BY Munn & Co.

ATTORNEYS

THE NORRIS PETERS CO., PHOTO-LITHO., WASHINGTON, D. C.

G. H. WILSON.

PREHEATER.

APPLICATION FILED DEC. 9, 1914.

Reissued Jan. 12, 1915.

13,868.

2 SHEETS—SHEET 2.

WITNESSES

Chas. H. Leibman

B. Joffe

INVENTOR

George H. Wilson

BY Munn & Co

ATTORNEYS

THE NORRIS PETERS CO., PHOTO-LITHO., WASHINGTON, D. C.

UNITED STATES PATENT OFFICE.

GEORGE H. WILSON, OF SPOKANE, WASHINGTON.

PREHEATER.

13,868. Specification of Reissued Letters Patent. Reissued Jan. 12, 1915.

Original No. 1,108,051, dated August 18, 1914, Serial No. 830,149. Application for reissue filed December 9, 1914. Serial No. 876,389.

*To all whom it may concern:*

Be it known that I, GEORGE H. WILSON, a citizen of the United States, and a resident of Spokane, in the county of Spokane and State of Washington, have invented a new and Improved Preheater, of which the following is a full, clear, and exact description.

My invention relates to feed-water preheaters for locomotive boilers.

Figure 1:
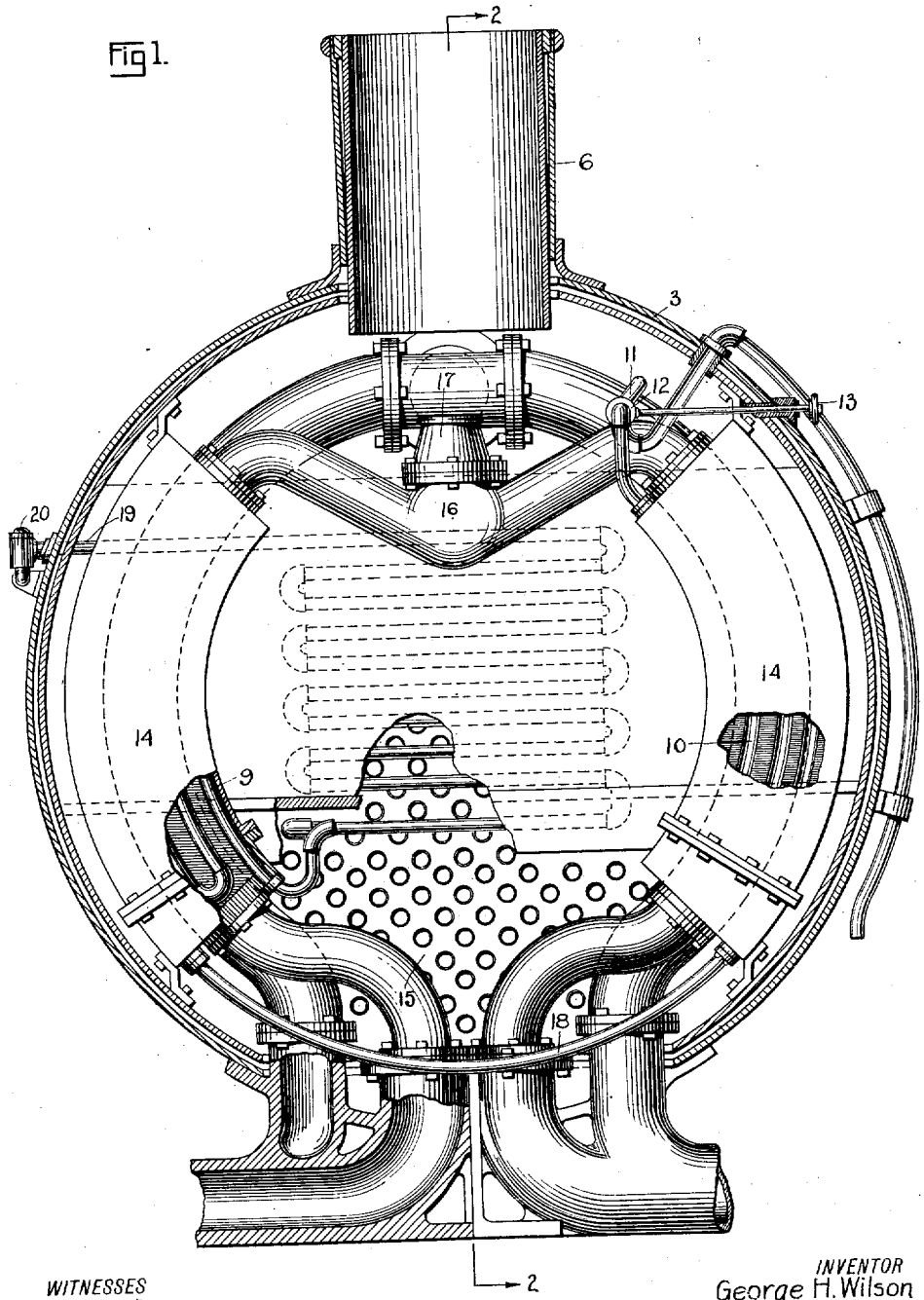
Figure 2:
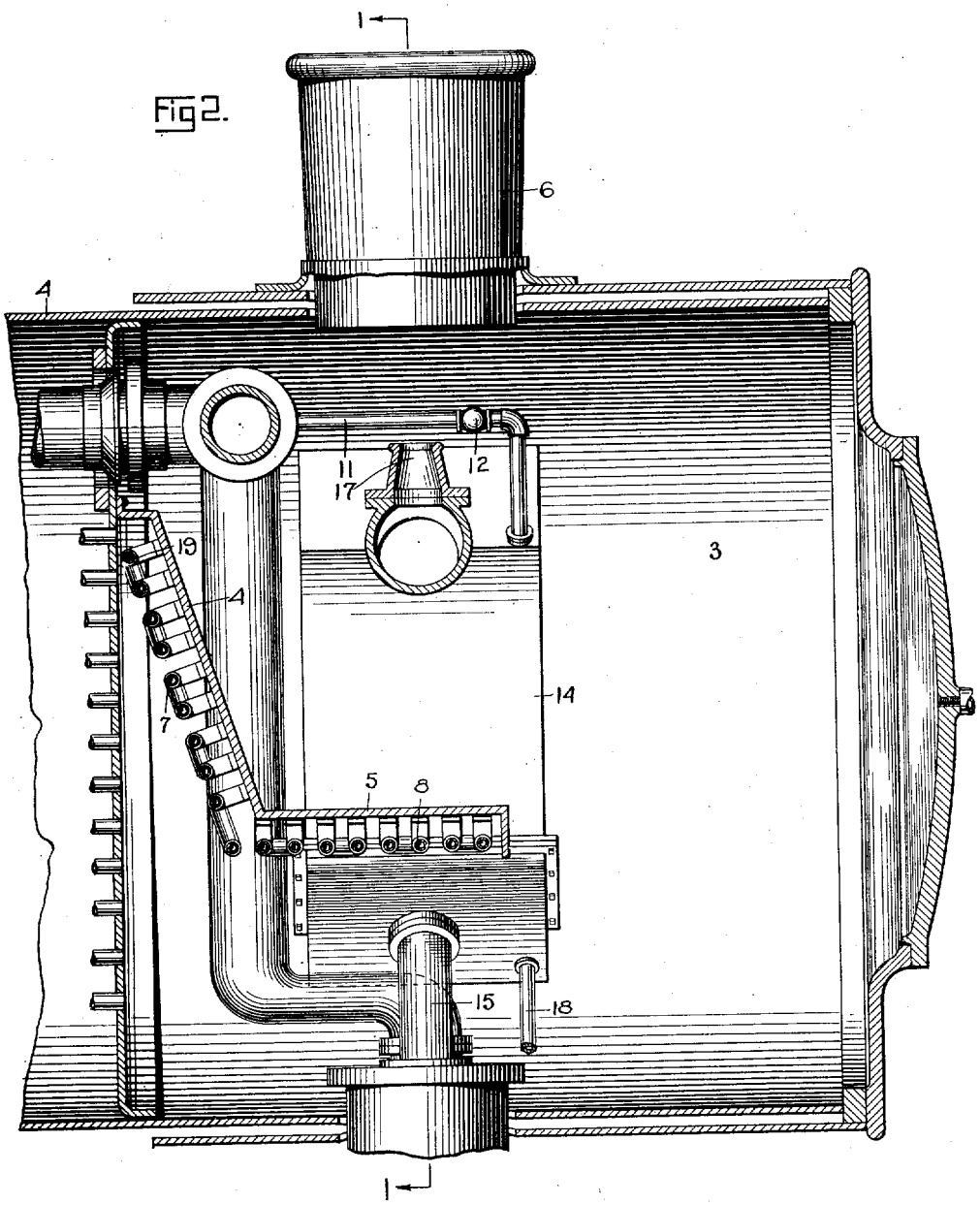

The object thereof is to provide a simple, efficient and inexpensive tubular preheater which can be easily cleaned and which will utilize the heat of the hot gas entering the smoke box, as well as that of the exhaust steam. I attain this object by the structure illustrated in the accompanying drawings forming a part of the specification, in which similar characters of reference indicate corresponding parts in both views and wherein Figure 1 is a transverse section on line 1—1, Fig. 2, through a smoke box provided with an embodiment of my invention partly in section to show the details of construction; and Fig. 2 is a longitudinal section through the smoke box on line 2—2, Fig. 1.

Referring to the drawings, 3 represents the smoke box in which, adjacent the boiler end, a baffle plate 4 is provided, which is secured by any suitable means to the end of the boiler and which has a substantially horizontal extension 5 forming a table therein. Said extension 5 forms an additional support for the baffle plate 4 and is positioned to face the smoke-stack 6 of the box. The baffle plate 4 carries a series of tubular coils 7 facing the end of the boiler and uniting with a series of coils 8 carried by the under side of the table 5. The coil 8 is in turn connected to a tubular coil 9 positioned adjacent the lateral surface of the box and connected to a similar coil 10 by a pipe 18 positioned on the opposite side adjacent the lateral surface of the box. The coil 10 is connected by a conduit 11 with the feed tank, and in which conduit 11 a valve 12 is provided which can be controlled from the outside of the box, as shown at 13. The coils 9 and 10 are each jacketed by means of a casing 14 surrounding each of the coils and suitably secured to the inner lateral surface of the smoke box. The casings 14 are preferably sections of an annular member, the center of which is in the axis of the box. The exhaust pipes 15 from the cylinders are connected to the lower ends of the casings 14, while the upper ends of the casings are united by a conduit 16 having a nozzle 17 facing the smoke-stack, so that the steam coming from the exhaust passes through the casings 14 which form a jacket for the coils 9 and 10 before it escapes through the nozzle 17 into the smoke-stack.

The feed water enters the coil 7 through a conduit 19 in which a ball check-valve 20 is provided. This feed water is heated as it passes through the coils 7 and 8 carried by the baffle plate and its extension, due to the fact that the hot gases from the boiler come directly across said coils 7 and 8 before the gases escape through the smoke-stack. From the coil 8 the feed water enters the coil 9 and then the coil 10, in which it is further heated by the exhaust steam from the engine passing through the casing 14 inclosing the said coils. The preheating of the feed water in the coils 7 and 8 before the water is heated in the coils 9 and 10 prevents condensation of the exhaust steam in the casing 14. It will also be noted that the casing 14 is also heated by the hot gases that have passed the baffle plate and its extension.

In my preheater the surface exposed to the action of the exhaust steam and that of the hot gases from the boiler is very large and, therefore, a very high efficiency is obtained.

The coils can be easily cleaned by closing the valve 12 and washing the same out by means of the feeding pump.

Particular attention is called to the provision of the baffle plate with the extension carrying the coils 7 and 8, exposing the maximum area of said coils to the action of the hot gases coming from the boiler. It will also be noted that as the feed water approaches the boiler, the same comes in contact with hotter gases, as the points of the coil 8 are farther away from the end of the boiler than the end of the coil 7, which is very close thereto. Thus it may be said that the feed water gradually increases in temperature as it approaches the boiler.

Having thus described my invention, I claim as new and desire to secure by Letters Patent:

1. In combination with a boiler having a smoke box, a preheater comprising a baffle plate in the box adapted to deflect the hot gases, and feed-water coils intermediate the baffle plate and the boiler.

2. In combination with a boiler having a smoke box, a preheater comprising a baffle plate in the box adapted to deflect the hot gases, and feed-water coils carried by the plate between the boiler and said plate.

3. In combination with a boiler having a smoke box, a preheater comprising a baffle plate in the box adapted to deflect the hot gases from the boiler, feed-water coils carried by the baffle plate between the boiler and said plate, and exhaust, steam-heated coils in said box connected to said first-mentioned coils, the feed water being adapted to be first heated by the hot gases and then by the exhaust steam.

4. In combination with a boiler having a smoke box, a preheater comprising a baffle plate in the box having a substantially horizontal extension, said baffle plate being positioned adjacent the end of the boiler, feed-water coils carried by the baffle-plate between the boiler and the plate and by said extension on the under side thereof, steam-heated coils in said box connected to the coils carried by the baffle plate and its extension, the feed-water passing through said coils being adapted to be first heated by the hot gases and then by the exhaust steam.

In testimony whereof I have signed my name to this specification in the presence of two subscribing witnesses.

GEORGE H. WILSON.

Witnesses:
OSCAR C. NELSON,
BEATRIX COLE.

Copies of this patent may be obtained for five cents each, by addressing the "Commissioner of Patents, Washington, D. C."